Oct. 31, 1967  M. KISH, JR  3,349,738
BUTT JOINT CONNECTION
Filed May 14, 1965
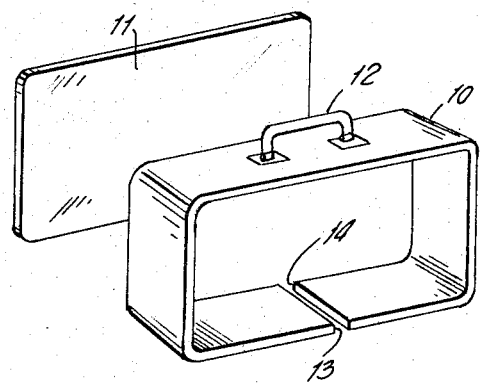
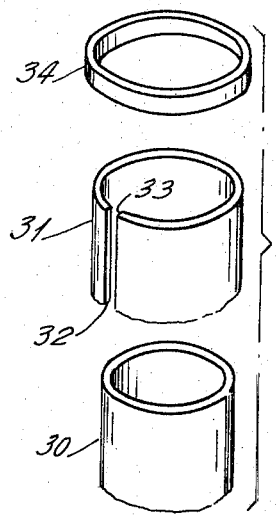
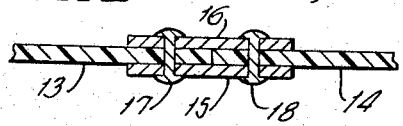
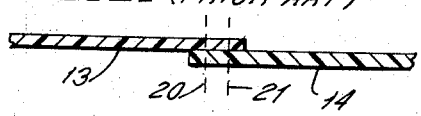
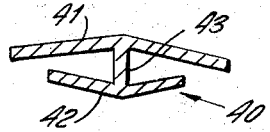
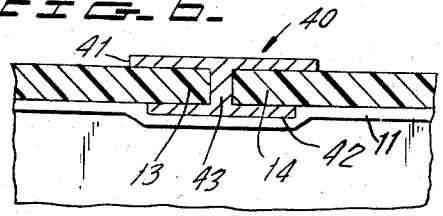
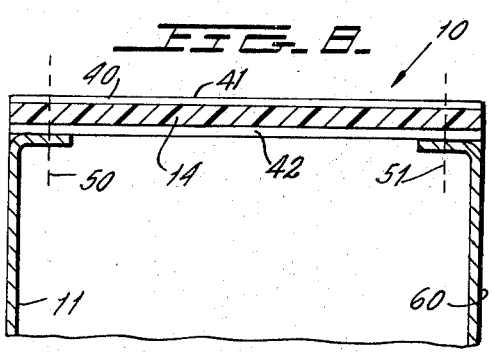
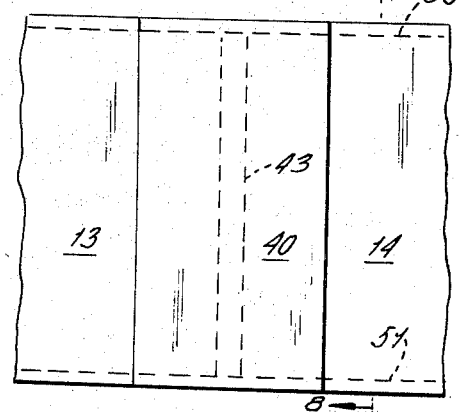
INVENTOR.
MICHAEL KISH, JR.
BY
OSTROLENK, FABER, GERB & SOFFEN
ATTORNEYS

# United States Patent Office 3,349,738
Patented Oct. 31, 1967

3,349,738
BUTT JOINT CONNECTION
Michael Kish, Jr., Hightstown, N.J., assignor to Atlantic Products Corporation, Trenton, N.J., a corporation of New Jersey
Filed May 14, 1965, Ser. No. 455,918
6 Claims. (Cl. 112—441)

ABSTRACT OF THE DISCLOSURE

A butt joint structure for butt joining the opposing edges of two elongated members formed of a flexible bridging member of plastic material having opposing re-entrant portions which receive the opposing members. Stitch lines are then formed perpendicularly through the opposite ends of the bridging member and extend through the bridging member and the members which are to be joined. The opposing re-entrant portions may include opposing surface members which are inwardly pressed to grip the members which are to be joined and hold them in position during the sewing operation.

This invention relates to a novel butt joint structure for use in the manufacture of luggage and golf bags and the like, but which has general application for the formation of any butt joint, and, in particular, relates to the use of a novel flexible bridging member having opposing re-entrant portions for receiving the opposing edges of members which are to be butted in combination with a subsequent stitch line which extends perpendicularly to the clamping member and the edges of the device to be butt joined.

There are many applications which require that two opposing edges of materials be connected together. This is commonly achieved by overlapping the edges and sewing or otherwise securing the edges to one another, or by butt joining the members and connecting them with some suitable bridging means.

The problem of butt joining or otherwise joining the opposing ends of elongated material frequently arises in the manufacture of luggage and golf bag cuffs. Thus, when making frames for luggage and the like, an elongated strip of material is bent to the frame shape and its opposing ends must be connected. To this end, and in the past, the ends defining the tubular frame of the member are overlapped or butted together and are thereafter secured together. Thereafter, the side panels of the bag are connected to the tubular frame.

The butt joint or overlapping joint is a frequent cause of unsightliness in the bag construction, since it leads to a bulky section in an otherwise constant thickness frame. In addition, the special handling techniques required in making the butt joint or overlap joint add to the expense of the bag.

The principle of the present invention is to provide a novel means for connecting the opposing edges of materials to one another along the butt joint by interposing a novel clamping means which receives and clamps the respective opposing ends of material to be connected together and holds them in an aligned position with a subsequent sewn line being made perpendicular to the butt joined seam to secure the entire assemblage together.

The novel clamping member is of thin and inexpensive plastic material which is relatively rigid and is capable of passing a sewing needle without danger of breaking the needle. The member is formed of two parallel sides having a central connecting web with the opposing sides deflected inwardly to provide a measure of clamping when the opposing sides on either side of the web extend over the edge of material which is to be butt joined. Thus, an operator merely clamps the opposing edges of material which is to be butt joined in the novel clamping structure with material being lightly held together as the operator subsequently rigidly secures the assemblage together by passing a stitch line through the edges to be clamped and the clamp itself. Note that this same stitch line which preferably passes through the end of the clamp can also serve to secure other components of luggage to the frame. Thus, the side panels of a carrying bag can be sewn to the frame with the same stitch line rigidly securing the butt joint clamping means.

Accordingly, a primary object of this invention is to provide a novel butt joint connection for the connection between two adjacent elongated materials.

Another object of this invention is to provide a novel auxiliary butt joint clamping means for use in making butt joints.

Another object of this invention is to form a novel and inexpensive butt joint in luggage and the like.

Yet another object of this invention is to provide a novel means for securing a butt joint together simultaneously with the connection of other components to the materials being butt joined.

These and other objects of this invention will become apparent from the following description when taken in connection with the drawings, in which:

FIGURE 1 is an exploded perspective view of a carrying bag which has a butt joined frame and a side panel which is to be subsequently connected to the bag after the frame is completed.

FIGURE 2 is an exploded perspective view of a golf bag and the golf bag cuff for finishing the bag.

FIGURE 3 is a cross-sectional view through a typical prior art butt joint.

FIGURE 4 is a cross-sectional view of a typical prior art overlap joint.

FIGURE 5 is a cross-sectional view of the novel butt joint clamp of the invention.

FIGURE 6 illustrates the manner in which the butt joint clamp of FIGURE 5 is used in butt joining material of the type shown in FIGURES 3 and 4.

FIGURE 7 is a top view of the butt joint of FIGURE 6.

FIGURE 8 is a cross-sectional view of FIGURE 7 taken across the line 8—8 in FIGURE 7.

Referring first to FIGURE 1, I have illustrated therein a typical carrying bag which is comprised of a frame member 10 and a rear panel member 11 which is to be secured to the frame 10. A front panel will also be used to enclose the front end of the bag, which is not shown.

In the formation of bags of this type, and as shown in my copending application Ser. No. 387,390, filed Aug. 4, 1964, now U.S. Patent No. 3,305,052, entitled, Luggage and Method of Manufacture for Luggage, and assigned to the assignee of the instant invention, it is possible to form the frame of an elongated relatively rigid material which has hardware such as the carrying handle 12 secured thereto with the bag means being thereafter bent to the general tubular shape shown.

It is now necessary to connect the ends 13 and 14 of the strip 10 together in some suitable manner. This connection can be made in several ways, as by the butt joint shown in FIGURE 3 wherein metallic bridging plates 15 and 16 bridge across the butt joint and are riveted together as by rivets 17 and 18. Note that this arrangement will require a relatively large amount of manufacturing time and materials, and will require specialized riveting equipment.

Alternatively, a less expensive joint can be made, as shown in FIGURE 4, where the ends 13 and 14 are overlapped and then sewn on the stitch lines 20 and 21. While this connection is less expensive than that of FIGURE 3, it will be apparent that it can lead to an unsightly arrangement, particularly where the material thickness of ends 13 and 14 is approximately 1/8". Moreover, where the butt joint of FIGURE 4 is used, it is necessary to cover the bottom thereof with a suitable finishing strip, or the like, thereby adding to the expense of the joint.

FIGURES 1, 3 and 4 have illustrated the commonly used butt joints for the case of luggage manufacture. Clearly, however, other devices require the formation of butt joints which lead to the same problems as those described with reference to these figures. For example, in the manufacture of golf bags, it is often necessary to form a tubular golf bag cuff of an elongated strip of material, the ends of which must be connected together.

Thus, in FIGURE 2, the schematically illustrated golf bag tube 30 must have a golf bag cuff 31 connected thereto which is formed of a rolled strip of material having abutting ends 32 and 33. Subsequently, a bumper 34 which may be of the type described in my copending application Ser. No. 442,255, filed Mar. 24, 1965, now U.S. Patent 3,315,719, entitled Golf Bag Cuff, and assigned to the assignee of the instant invention, can also be connected to the cuff 31.

It will be apparent from the following description of the drawings, that the butt joint described with reference to the luggage of FIGURES 1, 3 and 4 would apply with equal force to golf bag cuffs, and indeed, to any general formation of a butt joint between two adjacent ends of materials.

In accordance with the invention, a novel clamp is provided, shown as clamp 40 in FIGURE 5, which may be an extruded strip of any suitable relatively rigid plastic such as polyvinylchloride which has two opposing sides 41 and 42 which are joined by a central web 43. The opposing sides 41 and 42 are relatively thin, and could, for example, have a thickness of the order of 1/64", while the central web can have the thickness of 1/32".

In addition, the sides 41 and 42 are bent toward one another, thereby to define a light clamping action when material having a thickness equal to the height of web 43 is placed in the opposing side openings defined between sides 41 and 42.

FIGURES 6, 7 and 8 show the clamp 40 used to form the butt joint between ends 13 and 14 of the carrying bag of FIGURE 1. Thus, the end 13 is forced into the opening between the left-hand sides of sides 41 and 42, and is forced adjacent the web 43. In a similar manner, the end 14 is forced into the right-hand opening between sides 41 and 42 and up against the right-hand side of web 43. The ends 13 and 14 will then be lightly held in place with respect to one another by means of the light clamping action of the clamp 40.

In order to rigidly secure the butt joint together, a pair of stitch lines 50 and 51 are made adjacent the ends of clamp 40 and perpendicularly to the butt joint seam, whereupon the ends 13, 14 and clamp 40 are rigidly secured together, thereby holding the clamp rigidly in place. Note that the resultant butt joint is an attractively finished joint where, due to the relative thinness of sides 41 and 42, there is no undue bulkiness at the butt joint. That is to say, the thickness of sides 41 and 42 are of the order of 1/64", while the height of web 43 and thus the thickness of ends 13 and 14, may be of the order of 1/8".

While it is possible to provide the stitch lines 50 and 51 for the sole purpose of securing ends 13 and 14 and clamp 40, the present invention makes it further possible to incorporate this stitch line with a subsequent step in the manufacture of the bag of securing the panels to the bag.

Thus, as illustrated in FIGURE 8, the stitch line 50 could be the same stitch line used to secure panel 11 to the frame 10. The front panel of the bag 60, shown in FIGURE 8, would then be sewn to the frame 10 by the stitch line 51. Thus, additional economy of manufacture is made possible, since the butt joint for the frame 10 is secured in place at the same time the front and rear panels of the bag are sewn to the frame.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. In combination, first and second elongated end portions of materials to be butt joined, a clamp means and securement means; said clamp means having first and second elongated sides joined by a central web; said first elongated end portion positioned between said first and second sides and abutting one side of said web; said second elongated end portion positioned between said first and second sides and abutting the opposite side of said web; said securement means comprising stitch line means extending through said first and second sides and said first and second end portions and perpendicular to said central web.

2. The device as set forth in claim 1 wherein the thickness of said first and second end portions is substantially equal to the height of said web.

3. The device as set forth in claim 1 wherein said first and second sides are depressed toward one another on opposite sides of said web.

4. The device as set forth in claim 1 wherein said first and second sides are depressed toward one another on opposite sides of said web; said clamp means formed of rigid plastic material; said sides being forced outwardly of one another by said first and second end portions thereby to clamp onto said first and second end portions.

5. The device as set forth in claim 1 wherein said stitch line means includes first and second stitch lines respectively extending perpendicular to said web and along the opposite ends of said securement means.

6. The device substantially as set forth in claim 5 where said first and second end portions have a continuous side; panel means connected to said continuous side of said first and second end portions; said first stitch line extending through said panel means.

References Cited

UNITED STATES PATENTS

| | | | |
|---|---|---|---|
| 2,741,203 | 4/1956 | Rand | 2—275 X |
| 2,884,691 | 5/1959 | Rath et al. | 24—205.11 |
| 2,898,741 | 8/1959 | Milliken | 24—81 X |
| 3,191,727 | 6/1965 | Schmeltz et al. | 24—201.3 X |

JORDAN FRANKLIN, *Primary Examiner.*

G. H. KRIZMANICH, *Assistant Examiner.*